Sept. 6, 1949.     J. G. PREMO, JR     2,481,445
FISH LURE
Filed May 10, 1946
*Fig. 2.*
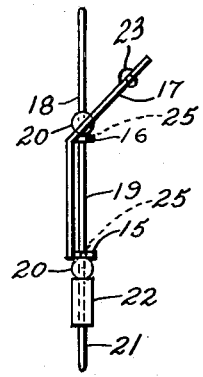
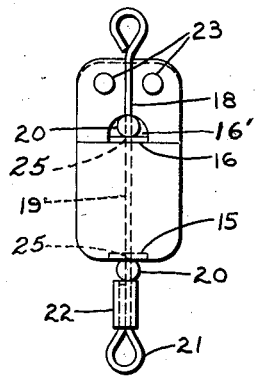
*Fig. 1.*
J. G. Premo Jr.
INVENTOR.
BY
ATTORNEYS.

Patented Sept. 6, 1949

2,481,445

UNITED STATES PATENT OFFICE 2,481,445

FISH LURE

Joseph George Premo, Jr., Barrington, Ill.

Application May 10, 1946, Serial No. 668,949

1 Claim. (Cl. 43—42.19)

An object of the invention is to provide a lure, comprising a body portion formed of a metal plate, plastic plate, or similar material, wherein the lure will spin when drawn through the water and will also have a butterfly type of action when the lure is allowed to settle to the bottom of the water, or when retrieved.

With the foregoing and other objects in view, which will appear as the description proceeds, the invention resides in the combination and arrangement of parts and in the details of construction hereinafter described and claimed, it being understood that changes in the precise embodiment of the invention herein described may be made within the scope of what is claimed, without departing from the spirit of the invention.

Referring to the drawing:

Fig. 1 is a front elevational view of a fish lure, constructed in accordance with the invention.

Fig. 2 is an edge elevational view of the lure.

Referring to the drawing in detail, the lure which is in the form of a plate is provided with spaced ears 15 and 16, the ear 15 being disposed at one end of the lure, while the ear 16 is disposed adjacent to the angularly disposed end portion 17 of the lure and is punched from the plate providing the opening 16', the shank 18 of the attaching wire 19, being extended through openings 25 in the ears 15, 16 and opening 16' formed in the extension 17. Secured to the wire 19 at points beyond the ears 15 and 16 are ball bearings 20, which ball bearings engage the outer surfaces of the ears 15 and 16, permitting the lure to rotate on the attaching wire 19, as the lure is drawn through the water. An eye 21 is formed at one end of the wire 19 and affords means whereby a hook may be attached to the lure. Directly above the eye 21 is a spacing sleeve 22 which contacts with the lower ball bearing 20 to hold the lure spaced from the eye 21 to ensure free rotary movement of the lure, and to serve as means for locking and unlocking the end for attaching or removing a hook.

Eyes 23 are formed on the offset portion of the lure to simulate the eyes of a fish.

From the foregoing it will be seen that due to the construction shown and described, I have provided a lure which will cause the fish lure to move through the water simulating live bait to attract fish.

Having thus described my invention, what is claimed is:

A fish lure comprising a plate, one end of the plate being extended at an oblique angle with respect to the main portion of the plate, an apertured ear extending laterally from one end of the plate, an apertured ear provided at the base of the angularly disposed end, said angularly disposed end having a hole in alignment with the apertures of said ears, the second-mentioned ear being disposed laterally aligning with the first-mentioned ear, an attaching wire extending through the aligning ears, said attaching wire also passing through said hole, and ball bearings on the wire resting against the ears, said plate being adapted to rotate around the attaching wire.

JOSEPH GEORGE PREMO, JR.

REFERENCES CITED

The following references are of record in the file of this patent:

UNITED STATES PATENTS

| Number | Name | Date |
|---|---|---|
| 1,420,422 | Foss | June 20, 1922 |
| 1,566,812 | Bayer | Dec. 22, 1925 |
| 1,620,972 | Hobbs | Mar. 15, 1927 |
| 1,943,283 | Beil | Jan. 16, 1934 |
| 2,212,294 | Larzelere | Aug. 20, 1940 |
| 2,272,710 | Hoover | Feb. 10, 1942 |
| 2,385,274 | Hammond | Sept. 18, 1945 |